US009416861B2

United States Patent
Ishikawa (10) Patent No.: US 9,416,861 B2
(45) Date of Patent: Aug. 16, 2016

(54) STRAIN WAVE GEARING WITH INVOLUTE POSITIVE DEFLECTION TOOTH PROFILE TAKING RIM THICKNESS INTO CONSIDERATION

(75) Inventor: Shoichi Ishikawa, Yokohama (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 287 days.

(21) Appl. No.: 14/368,952

(22) PCT Filed: Jan. 10, 2012

(86) PCT No.: PCT/JP2012/000097
§ 371 (c)(1),
(2), (4) Date: Jun. 26, 2014

(87) PCT Pub. No.: WO2013/105127
PCT Pub. Date: Jul. 18, 2013

(65) Prior Publication Data
US 2014/0345406 A1 Nov. 27, 2014

(51) Int. Cl.
*F16H 49/00* (2006.01)
*F16H 55/08* (2006.01)

(52) U.S. Cl.
CPC .......... *F16H 49/001* (2013.01); *F16H 55/0833* (2013.01); *F16H 2049/003* (2013.01); *Y10T 74/19642* (2015.01)

(58) Field of Classification Search
CPC .............. F16H 49/001; F16H 55/0833; F16H 2049/003
See application file for complete search history.

(56) References Cited

U.S. PATENT DOCUMENTS

| 2,906,134 | A |   | 9/1959  | Musser  |             |
|-----------|---|---|---------|---------|-------------|
| 4,823,638 | A | * | 4/1989  | Ishikawa | F16C 19/50 74/462 |
| 4,974,470 | A | * | 12/1990 | Ishikawa | F16H 55/0833 74/640 |
| 2007/0180947 | A1 |   | 8/2007 | Ishikawa et al. | |

(Continued)

FOREIGN PATENT DOCUMENTS

JP 45-41171 12/1970
JP 63-115943 A 5/1988

(Continued)

OTHER PUBLICATIONS

International Search Report (PCT/ISA/210) mailed on Mar. 27, 2012, by the Japanese Patent Office as the International Searching Authority for International Application No. PCT/JP2012/000097.

*Primary Examiner* — William Kelleher
*Assistant Examiner* — Gregory Prather
(74) *Attorney, Agent, or Firm* — Buchanan Ingersoll & Rooney PC (57) ABSTRACT

In the strain wave gearing, an involute positive deflection tooth profile of a low pressure angle of less than 20° is used as the basic tooth profile for the rigid internal spur gear and the flexible external spur gear in order to increase the effective tooth depth. Continuous meshing of the two gears in the tooth trace direction is made possible by shifting the external teeth so that the linear parts of the rack tooth profiles coincide when viewed along the tooth trace direction. The root rim thickness of the front end of the external teeth of the flexible external spur gear is set to an optimal thickness and the root rim thicknesses at various positions other than the front end of the external teeth in the tooth trace direction are set to appropriate values.

6 Claims, 9 Drawing Sheets

(56) References Cited

U.S. PATENT DOCUMENTS

| | | | |
|---|---|---|---|
| 2007/0266819 A1* | 11/2007 | Ishikawa | F16H 55/0833 74/640 |
| 2008/0060466 A1 | 3/2008 | Ishikawa | |
| 2009/0044651 A1* | 2/2009 | Yamamori | B62D 5/008 74/461 |
| 2013/0081496 A1* | 4/2013 | Ishikawa | F16H 1/10 74/412 R |
| 2014/0345406 A1* | 11/2014 | Ishikawa | F16H 49/001 74/412 R |
| 2014/0345407 A1* | 11/2014 | Lin | F16H 49/001 74/412 R |

FOREIGN PATENT DOCUMENTS

| | | |
|---|---|---|
| JP | 64-079448 A | 3/1989 |
| JP | 2007-211907 A | 8/2007 |
| JP | 2011-144916 A | 7/2011 |
| WO | WO 2005/121597 A1 | 12/2005 |
| WO | WO 2010/023710 A1 | 3/2010 |
| WO | WO 2010/070712 A1 | 6/2010 |

* cited by examiner

STRAIN WAVE GEARING WITH INVOLUTE POSITIVE DEFLECTION TOOTH PROFILE TAKING RIM THICKNESS INTO CONSIDERATION

TECHNICAL FIELD

The present invention relates to a strain wave gearing provided with an involute positive deflection tooth profile having a deep tooth depth and being capable of continuous meshing over a wide area in the tooth trace direction. More specifically, the present invention relates to a strain wave gearing with an involute positive deflection tooth profile taking rim thickness into consideration in which transmission torque can be increased by optimizing the rim-thickness-related settings of a flexible externally toothed gear.

BACKGROUND ART

Since its invention by C. W. Musser (Patent Document 1), the strain wave gearing has been contrived in a variety of inventions and designs by many researchers including the present inventor(s), as well as Musser himself. There are even a variety of inventions related merely to the tooth profile of strain wave gearings. In Patent Document 2, the present inventor proposed using the basic tooth profile of the strain wave gearing as an involute tooth profile, and in Patent Documents 3 and 4 proposed using a technique in which a rack is used to approximate the meshing of the teeth of a rigid internally toothed gear and a flexible externally toothed gear in a strain wave gearing as a tooth-profile-designing method for deriving a tooth profile for the tooth ends of both gears, which have a large area of contact. In Patent Document 5, the present inventor proposed a high-ratchet-torque tooth profile enabling continuous meshing in a strain wave gearing.

Typically, strain wave gearings have a circular rigid internally toothed gear, a flexible externally toothed gear disposed coaxially within the internally toothed gear, and a wave generator fitted within the externally toothed gear. The flexible externally toothed gear comprises a flexible cylindrical barrel part, a diaphragm extending radially from a trailing end of the cylindrical barrel part, and external teeth formed on the outer peripheral portion of the leading end opening side of the cylindrical barrel part. A flexible externally toothed gear formed in a state where the diaphragm closes off the trailing end opening of the cylindrical barrel part is known as a cup-shaped flexible externally toothed gear, and a flexible externally toothed gear formed in a state where the diaphragm expands outward from the trailing end of the cylindrical barrel part is known as a top-hat-shaped flexible externally toothed gear. Flexible externally toothed gears of either shape are flexed into an ellipsoidal shape by the wave generator, and the external teeth formed on the outer peripheral portion of the cylindrical barrel part of either flexible externally toothed gear mesh with the internal teeth of the rigid internally toothed gear on both ends of the ellipsoid in the direction of the major axis.

When the flexible externally toothed gear is ellipsoidally deformed by the wave generator, the rim-neutral circle of the external teeth of the flexible externally toothed gear is also deformed into an ellipsoidal rim-neutral curve. Here, "rim-neutral circle" refers to a circle described by the line of intersection between a neutral surface and a transverse cross-section of the flexible externally toothed gear, where "neutral surface" refers to a surface passing through the thickness (root rim thickness) center of the root part of the flexible externally toothed gear while the flexible externally toothed gear is in a perfectly circular state before being flexed into an ellipsoidal shape, and "rim-neutral curve" refers to a curve after the rim-neutral circle has been flexed into an ellipsoidal shape. The ratio $w/w_0$ is known as the "deflection coefficient $\kappa$," where $w$ is the degree of radial flexing relative to the pre-deformation rim-neutral circle at a major-axis position on the ellipsoidal rim-neutral curve, and the normal (standard) degree of flexing $w_0$ is the value obtained by dividing the radius of the rim-neutral circle by the reduction ratio of the strain wave gearing. "Non-deflected flexing" refers to a case where the normal degree of flexing is obtained, "positive deflection flexing" refers to a case where a degree of flexing larger than the normal degree of flexing ($\kappa>1$) is obtained, and "negative deflection flexing" refers to a case where a degree of flexing smaller than the normal degree of flexing ($\kappa<1$) is obtained.

The degree of flexing along the tooth trace direction of the external teeth of the ellipsoidally flexed flexible externally toothed gear, from the trailing end part of the side of the diaphragm toward the leading end part of the leading end opening side, increases substantially in proportion with respect to the distance from the diaphragm. Individual portions of the external teeth of the flexible externally toothed gear undergo repeated radial flexing as the wave generator rotates. This flexing of the flexible externally toothed gear is known as "coning." When the degree of flexing in a transverse cross-section in the tooth-trace-direction center of the external teeth is set as the normal degree of flexing ($\kappa=1$), a positive-deflection state of flexing will be assumed on the side of the external teeth closer to the leading end part, and a negative-deflection state of flexing will be assumed on the side closer to the trailing end part. An external-tooth profile in a state of positive deflection flexing across the entirety of the external teeth in the tooth trace direction is known as a "positive deflection tooth profile," and an external-tooth profile in a state of negative deflection flexing across the entirety of the external teeth in the tooth trace direction is known as a "negative deflection tooth profile."

[Patent Document 1] U.S. Pat. No. 2,906,134
[Patent Document 2] JP-B 45-41171
[Patent Document 3] JP-A 63-115943
[Patent Document 4] JP-A 64-79448
[Patent Document 5] JP-A 2007-211907

DISCLOSURE OF THE INVENTION

Problems to be Solved by the Invention

Currently, there is strong demand in markets for improved load torque performance in strain wave gearings. Achieving this requires a rational tooth profile enabling continuous meshing along the entire tooth trace while taking coning of the flexible externally toothed gear into consideration.

Another demand is for there to be a countermeasure against ratcheting in strain wave gearings having high reduction ratios. At high reduction ratios where there are more than 200 teeth on both gears, it is necessary to increase the tooth depth in order to prevent ratcheting during high load torque.

In prior-art inventions of strain-wave-gearing tooth profiles, the tooth profile has been regarded as a separate entity irrespective of the rim thickness of the flexible externally toothed gear. Specifically, no correlation has ever been thought to exist between the root rim thickness of the flexible externally toothed gear relating to transmission torque and the tooth profile. Even if a tooth profile allowing continuous meshing in which coning of the flexible externally toothed gear is taken into consideration is set so that the transmission torque can increase, it is impossible to increase the transmission torque of the flexible externally toothed gear should the root rim thickness at which the increased transmission torque can be transmitted not be provided. When using a modified tooth profile in which modification is performed at differing degrees along the tooth trace direction with coning of the external teeth being taken into consideration, the root rim thickness must be suitably set in each position in the tooth trace direction in order to allow the transmission torque to be increased.

An object of the present invention is to propose a strain wave gearing in which there is adopted, for the tooth profile of both gears, an involute tooth profile that preserves correct meshing in a main cross-section set in a predetermined position in the tooth trace direction, retains substantially equivalent meshing even in another transverse cross-section in the tooth trace direction, and provides a deep tooth depth at which ratcheting under high load torque can be prevented even at high reduction ratios; and in which the transmission torque can be increased by optimizing a setting relating to the root rim thickness of the flexible externally toothed gear.

Means to Solve the Problems

In order to resolve the aforementioned problem, according to the strain wave gearing of the present invention, an involute tooth profile of a low pressure angle of less than 20° is used as the basic tooth profile for the rigid internally toothed gear and the flexible externally toothed gear in order to increase the effective tooth depth. Therefore, in a reference transverse cross-section ("main cross-section" below) set at a position partway along the external teeth of the flexible externally toothed gear in the tooth trace direction, the tooth depth is made greater than the standard 2m (m is the module), such that $\kappa_0 m = 2(1+c)m$. Here, the deflection coefficient $\kappa_0 = 1+c$, where $0 < c < 0.5$.

Focusing on the fact that the rack tooth profile of an involute tooth profile is a straight line, there is realized a tooth profile that enables approximation of continuous meshing across the entire tooth trace of both gears, taking coning of the teeth into consideration. Therefore, a modification accounting for coning in regard to the external teeth is made along the tooth trace direction thereof so that the linear parts of the rack tooth profiles in each of the tooth-trace-direction transverse cross-sections of the external teeth coincide when viewed along the tooth trace direction.

The root rim thickness of the flexible externally toothed gear is set so as to be ideal in each transverse cross-section in the tooth trace direction. Therefore, the root rim thickness of the leading end part of the external teeth of the flexible externally toothed gear in the tooth trace direction is set to an optimal thickness using a revised Goodman diagram. The root rim thicknesses at various positions other than the leading end part of the external teeth in the tooth trace direction are set to ideal thicknesses using the revised Goodman diagram, taking the correlation between the tooth profile and the transmission torque into account.

Specifically, according to the present invention, there is provided a strain wave gearing having a rigid internally toothed gear that is a modified spur gear with a module m, a flexible externally toothed gear that is a modified conical gear with a module m and disposed within the rigid internally toothed gear, and a wave generator fitted within the flexible externally toothed gear, the flexible externally toothed gear comprising a flexible cylindrical barrel part and a circular diaphragm extending radially from a trailing end of the cylindrical barrel part, and external teeth formed on a region of the leading end opening part of the cylindrical barrel part being flexed by the wave generator into an ellipsoidal shape from the trailing end part on the diaphragm side to the leading end part on the opening side so that a degree of flexing substantially proportional to the distance from the diaphragm is produced; wherein:

the strain wave gearing is characterized in that:

the number of teeth of the flexible externally toothed gear is 2n less than the number of teeth of the rigid internally toothed gear, where n is a positive integer;

the flexible externally toothed gear is ellipsoidally deformed by the wave generator, whereby a rim-neutral circle of the external teeth of the flexible externally toothed gear is deformed into an ellipsoidal rim-neutral curve, and the degree of radial flexing with respect to the rim-neutral circle in a position on the major axis of the rim-neutral curve is $\kappa$ mn, where $\kappa$ is a deflection coefficient greater than 1;

the internal tooth base tooth profile of the rigid internally toothed gear and the external tooth base tooth profile of the flexible externally toothed gear are involute tooth profiles having a pressure angle $\alpha$ of less than 20°;

there are determined movement loci of the external teeth of the flexible externally toothed gear in relation to the internal teeth of the rigid internally toothed gear, obtained when rack meshing is used to approximate meshing with the rigid internally toothed gear in a transverse cross-section at each tooth-trace direction position of the external teeth of the flexible externally toothed gear;

when, taking a transverse cross-section set in a desired position of the external teeth of the flexible externally toothed gear in the tooth trace direction to be the main cross-section, the movement locus obtained in the main cross-section is called the first movement locus, and the movement locus obtained in each transverse cross-section of the external teeth other than the main cross-section is called the second movement locus, and the tangent drawn on the loop-shaped apex of the first movement locus at which the angle formed with the major axis of the rim-neutral curve is the pressure angle $\alpha$ is called a first tangent, and the tangent drawn on the loop-shaped apex of the second movement locus at which the angle formed with the major axis of the rim-neutral curve is the pressure angle $\alpha$ is called a second tangent, the tooth profile of each transverse cross-section of the external teeth other than the main cross-section is a modified tooth profile modified to a base tooth profile comprising the involute tooth profile such that the second tangent coincides with the first tangent when viewed along the tooth trace direction of the external teeth;

a revised Goodman line AB connecting a point A on the vertical axis (O, $\sigma_A$) representing an alternating stress limit ($\sigma_A$) of a steel that is a material of the flexible externally toothed gear and a point B on the horizontal axis ($\sigma_B$, O) representing a center value ($\sigma_B$) between the yield stress and the tensile strength of the steel is drawn in planar coordinates to produce a revised Goodman diagram; and the root rim thickness of the external teeth of the flexible externally toothed gear is determined such that a coordinate point P ($\sigma_n/2$, $\sigma_b + \sigma_n/2$) will, in accompaniment with the ellipsoidal deformation of the flexible externally toothed gear, fall within a triangular acceptable range enclosed by the revised Goodman line AB, the horizontal axis, and the vertical axis of the revised Goodman diagram, the vertical axis being the stress amplitude ($\sigma_b + \sigma_n/2$), which is the sum of the flexural stress ($\sigma_b$) derived from flexing of the major axis appearing on the surface of the root rim and half the tensile stress ($\sigma_b$) generated by the transmission torque on the root rim, and the horizontal axis being the average stress ($\sigma_n/2$), or half the tensile stress.

Here, the strain wave gearing of the present invention is characterized in that the root rim thickness $t_m$ of the leading end part of the external teeth of the flexible externally toothed gear is determined by the following expression on the basis of the revised Goodman diagram.

$$t_m = \sigma_A RD/(6E)$$

$\sigma_A$ the alternating stress limit of the steel that is the material of the flexible externally toothed gear R reduction ratio of the strain wave gearing D diameter of the rim-neutral circle of the flexible externally toothed gear E Young's modulus of the steel that is the material of the flexible externally toothed gear.

Specifically, the root rim thickness $t_m$ of the leading end part of the external teeth of the flexible externally toothed gear is determined such that the position of a coordinate point P ($\sigma_n/2$, $\sigma_b+\sigma_n/2$) in the revised Goodman diagram will, in accompaniment with the ellipsoidal deformation of the flexible externally toothed gear, be the midpoint M of a line segment AC, where C is the intersection of the revised Goodman line AB and a line passing through the origin at an angle of 45° from the horizontal axis, where the vertical axis is the stress amplitude ($\sigma_b+\sigma_n/2$), which is the sum of the flexural stress ($\sigma_b$) derived from flexing of the major axis appearing on the surface of the root rim and half the tensile stress ($\sigma_n$) generated by the transmission torque on the root rim, and the horizontal axis is the average stress ($\sigma_n/2$), or half the tensile stress.

The strain wave gearing of the present invention is characterized in that the tooth depth is corrected on the internal teeth of the rigid internally toothed gear so that there is no interference with the modified tooth profile from a position corresponding to the main cross-section of the external teeth to the trailing end part corresponding to the trailing end part of the external teeth along the tooth trace direction.

Here, it is preferable that the tooth depth in the main cross-section of the external teeth be $\kappa_0$ nm, where $\kappa_0$ is the deflection coefficient $\kappa$ in the main cross-section, and that deflection coefficient $\kappa_0$ be such that $\kappa_0=1+c$ (0<c<0.5).

A degree of modification h of the modified tooth profile can be derived from the following formula, where the deflection coefficient $\kappa$ in the main cross-section of the external teeth is $\kappa_0$ (>1), the horizontal axis is the deflection coefficient $\kappa$, and the vertical axis is the degree of modification h.

$$h = \kappa \sqrt{1 - \left(\frac{2\tan\alpha/\kappa - \sqrt{1 + (2\tan\alpha)^2 - 1/\kappa^2}}{1 + (2\tan\alpha)^2}\right)^2} -$$

$$\kappa_0 \sqrt{1 - \left(\frac{2\tan\alpha/\kappa_0 - \sqrt{1 + (2\tan\alpha)^2 - 1/\kappa_0^2}}{1 + (2\tan\alpha)^2}\right)^2} +$$

$$0.5/\tan\alpha \left( \sin^{-1} \frac{2\tan\alpha/\kappa - \sqrt{1 + (2\tan\alpha)^2 - 1/\kappa^2}}{1 + (2\tan\alpha)^2} - \right.$$

$$\sin^{-1} \frac{2\tan\alpha/\kappa_0 - \sqrt{1 + (2\tan\alpha)^2 - 1/\kappa_0^2}}{1 + (2\tan\alpha)^2} -$$

$$\frac{2\tan\alpha - \kappa\sqrt{1 + (2\tan\alpha)^2 - 1/\kappa^2}}{1 + (2\tan\alpha)^2} +$$

(Formula 1)

$$\left. \frac{2\tan\alpha - \kappa_0\sqrt{1 + (2\tan\alpha)^2 - 1/\kappa_0^2}}{1 + (2\tan\alpha)^2} \right)$$

Here, the degree of modification curve obtained by the above formula can be approximated by a tangent drawn to a point of the deflection coefficient $\kappa_0$ in the degree of modification curve; therefore, the degree of modification can be defined using the tangent as an approximating line.

Next, the flexible externally toothed gear will be a conical gear having teeth of equal depth. In this case, in an axial cross-section including the major axis in a state where the flexible externally toothed gear is ellipsoidally deformed, the cylindrical top land of the external teeth of the flexible externally toothed gear may be a conical surface in which the external diameter gradually diminishes from the trailing end part to the leading end part in the tooth trace direction so that the tips of the external teeth are substantially parallel to the roots of the internal teeth of the rigid internally toothed gear.

Effect of the Invention

In the strain wave gearing of the present invention, the flexible externally toothed gear has positive deflection flexing where the degree of flexing is greater than the normal degree of flexing, the rigid internally toothed gear and the flexible externally toothed gear have an involute tooth profile of a low pressure angle smaller than standard, and the external teeth are modified such that the linear parts of the involute tooth profile of each transverse cross-section of the external teeth coincide in the tooth trace direction of the external teeth of the flexible externally toothed gear. The tooth profile of both gears can thereby have a deep tooth depth, the meshing of both tooth profiles can thereby be achieved not only in the transverse cross-sections thereof but also in a direction perpendicular to the transverse cross-section along the tooth trace, and the desired transmission torque can thereby be maintained even with a high reduction ratio. The root rim thickness of the flexible externally toothed gear, which has not conventionally been taken into consideration, can also be set, in each position in the tooth trace direction, to an optimal thickness harmonized with the transmission torque. Therefore, according to the present invention, the transmission torque of the flexible externally toothed gear of the strain wave gearing can be substantially higher than in the conventional art.

BRIEF DESCRIPTION OF THE DRAWINGS

FIGS. 7 (A), (B), and (C) illustrate the meshing of the flexible externally toothed gear and the rigid internally toothed gear in the leading end part, the main cross-section, and the trailing end part, respectively, of the external teeth in the tooth trace direction, both gears sharing a linear-part tooth profile in all cases;

MODE FOR CARRYING OUT THE INVENTION

Configuration of Strain Wave Gearing

Figure 1:
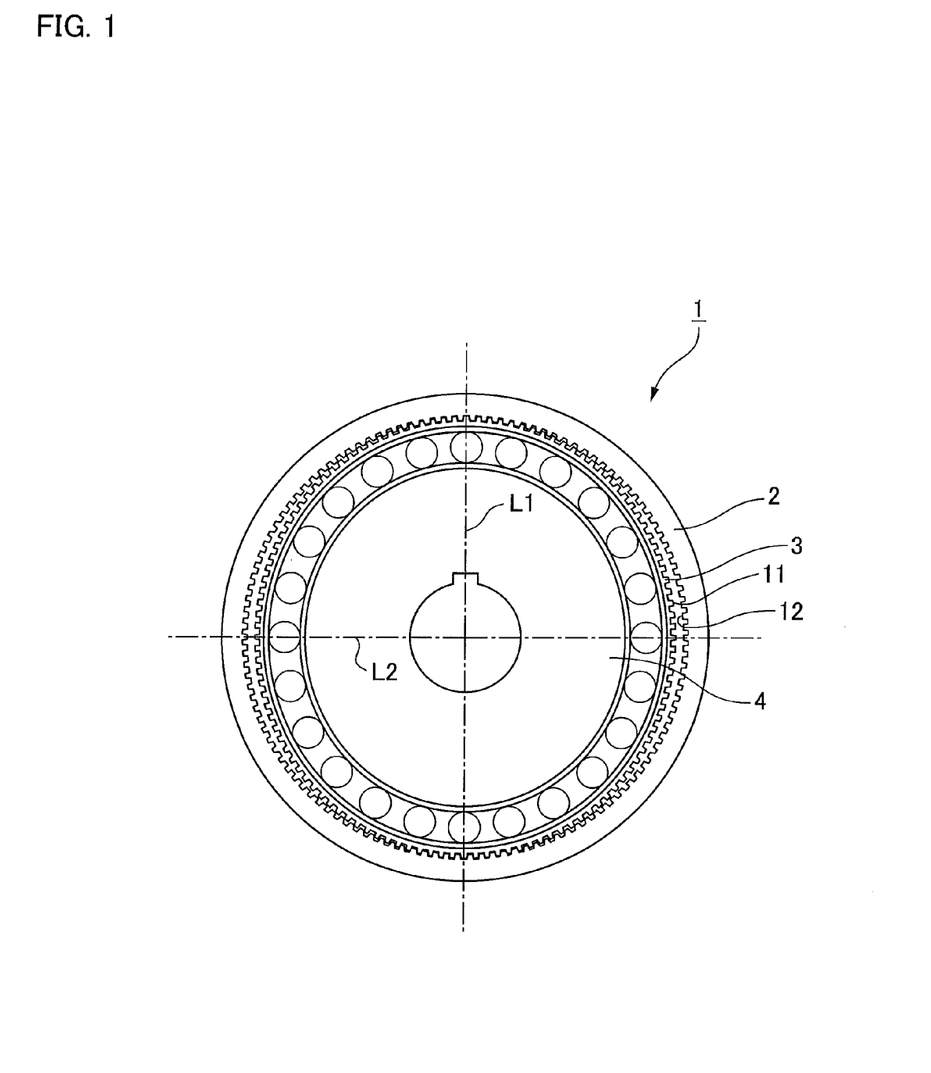
FIG. 1 is a schematic front view of a typical strain wave gearing.
Figure 2:
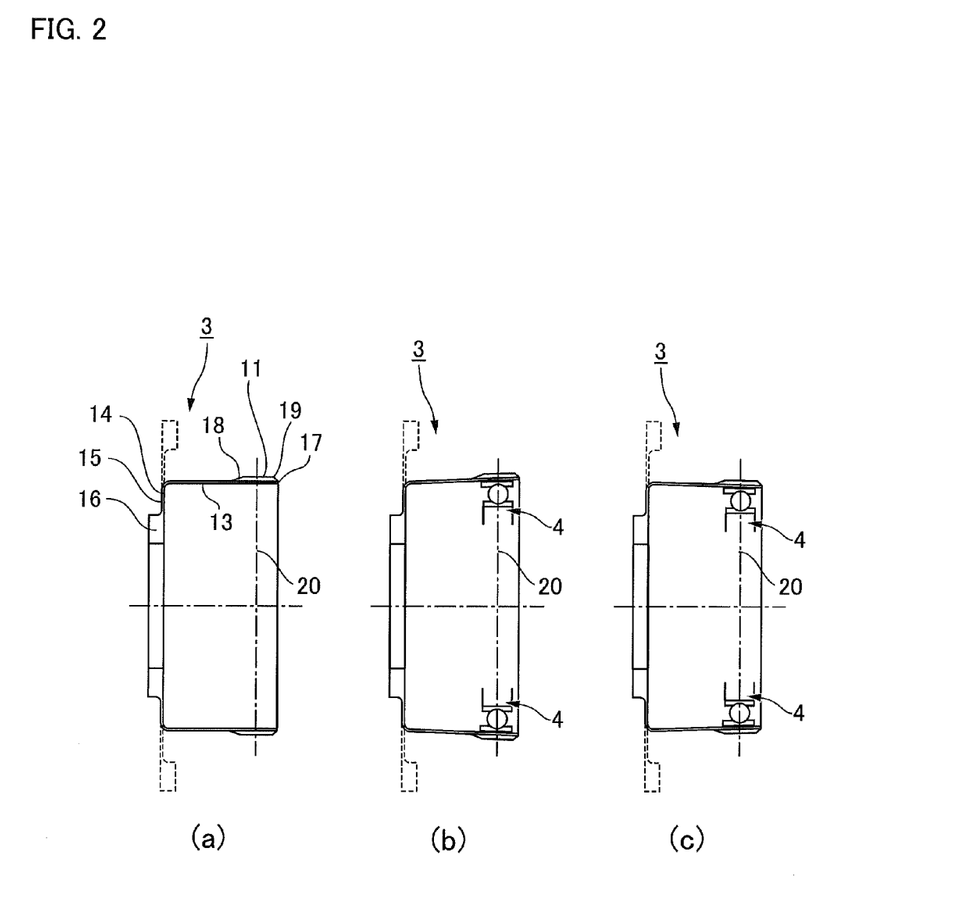
FIG. 2 is a diagram showing a cup-shaped and top-hat-shaped flexible externally toothed gear in a flexed state, where (a) shows the state before deformation, (b) shows the state in a cross-section that includes the major axis of the ellipsoid after ellipsoidal deformation, and (c) shows the state in a cross-section that includes the minor axis of the ellipsoid after ellipsoidal deformation.

FIG. 1 is a front view of a strain wave gearing that is an object of the present invention. FIGS. 2 (a) through (c) are cross-sections showing the flexible externally toothed gear in a flexed state, where (a) shows the state of the flexible externally toothed gear before deformation, (b) shows a cross-section including the major axis after the flexible externally toothed gear has been flexed into an ellipsoidal shape, and (c) shows a cross-section including the minor axis after the flexible externally toothed gear has been flexed into an ellipsoidal shape. In FIGS. 2 (a) through (c), the solid lines show a cup-shaped flexible externally toothed gear, and the dashed lines show a top-hat-shaped flexible externally toothed gear.

As shown in these drawings, a strain wave gearing 1 has a circular rigid internally toothed gear 2, a flexible externally toothed gear 3 disposed within the rigid internally toothed gear, and a wave generator 4 encased within the flexible externally toothed gear that has an ellipsoidal contour. The rigid internally toothed gear 2 is a modified spur gear having module m, and the flexible externally toothed gear 3 is a modified conical gear having module m, these gears having, for example, 200 or more teeth. The flexible externally toothed gear has 2n fewer teeth than the rigid internally toothed gear, where n is a positive integer. Typically n=1; therefore, the difference between the number of teeth is 2.

The flexible externally toothed gear 3 of the strain wave gearing 1 is flexed into an ellipsoidal shape by the wave generator 4, which has an ellipsoidal contour. The external teeth 11 of the flexible externally toothed gear 3 mesh with the internal teeth 12 of the rigid internally toothed gear 2 in the vicinity of both ends of the ellipsoidal curve of the flexible externally toothed gear 3 in the direction of the major axis L1 after the flexible externally toothed gear 3 is flexed. When the wave generator 4 rotates, the positions in which both gears 2, 3 mesh move in the circumferential direction, and relative rotation is generated between both gears 2, 3 in accordance with the difference in the number of teeth of both gears. The flexible externally toothed gear 3 comprises a flexible cylindrical barrel part 13, a diaphragm 15 extending radially in continuation from the trailing end 14 of the cylindrical barrel part 13, and a boss 16 continuing from the diaphragm 15. The external teeth 11 are formed on the external circumferential surface portion on the side of the opening end 17 of the cylindrical barrel part 13.

The degree of flexing of the cylindrical barrel part 13 toward the outside or the inside in the radial direction from the diaphragm-side trailing end 14 to the opening end 17 is gradually increased by the ellipsoidally contoured wave generator 4 fitted in the internal circumferential surface portion of the external-tooth-formed portion of the cylindrical barrel part 13. The degree of flexing toward the outside in a cross-section including the major axis L1 of the ellipsoidal curve gradually increases in proportion to the distance from the trailing end 14 to the opening end 17 as shown in FIG. 2 (b), and the degree of flexing toward the inside in a cross-section including the minor axis L2 of the ellipsoidal curve gradually increases in proportion to the distance from the trailing end 14 to the opening end 17 as shown in FIG. 2 (c). Therefore, the degree of flexing of the external teeth 11 formed on the external circumferential surface portion near the opening end 17 from the diaphragm-side trailing end part 18 toward the opening-end-side leading end part 19 also gradually increases in proportion to the distance from the trailing end 14 (diaphragm 15).

It being an object of the present invention to prevent ratcheting, the flexible externally toothed gear 3 is set so as to have positive deflection flexing (deflection coefficient $\kappa > 1$) in order for the effective tooth depth of the external teeth 11 and the internal teeth 12 to be greater than the standard tooth depth. A rack is used in the present invention to approximate the relative motion of both gears 2, 3 of the strain wave gearing 1.

Figure 3:
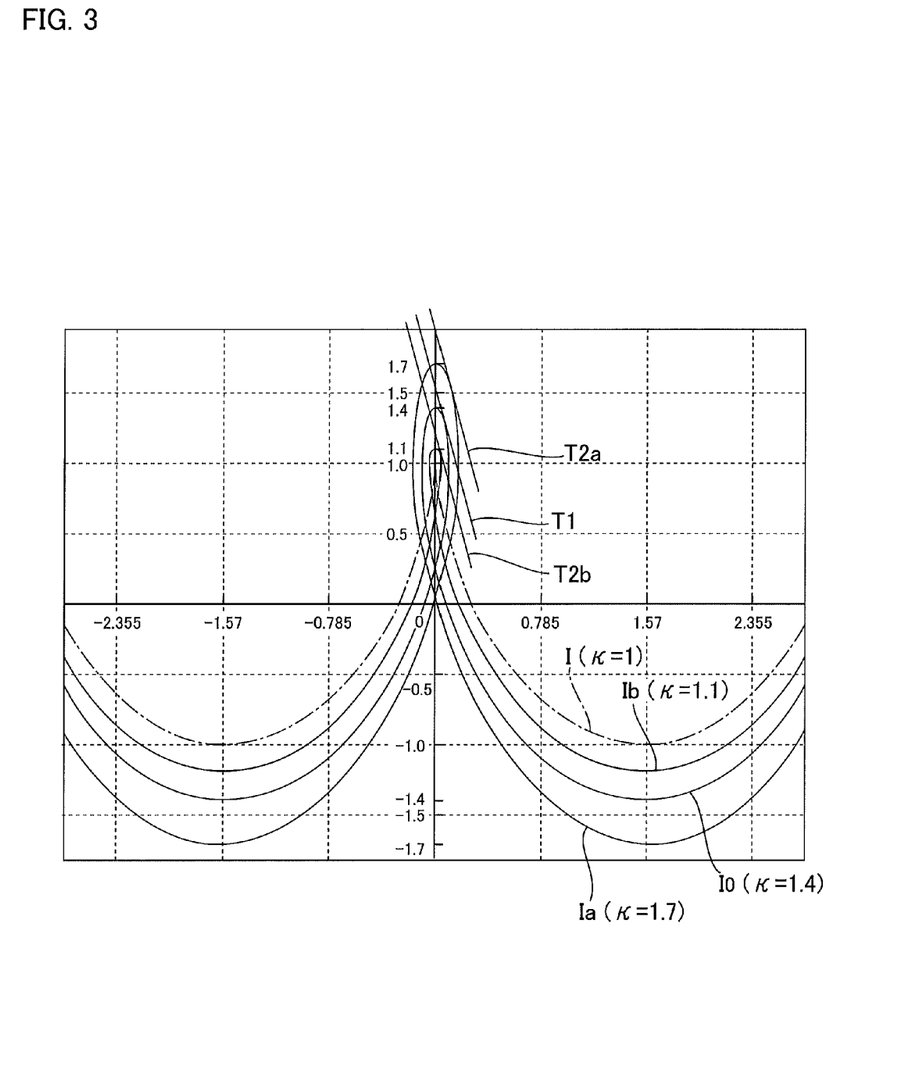
FIG. 3 is a drawing showing movement loci obtained in a case where a rack is used to approximate the relative motion of both the rigid internally toothed gear and the flexible externally toothed gear in cross-sections at three locations (main cross-section, leading end part, and trailing end part) serving as a basis for forming the tooth profile of the present invention.

FIG. 3 shows movement loci of points on the ellipsoidal rim-neutral curve of the external teeth 11 of the flexible externally toothed gear 3 with respect to the internal teeth 12 of the rigid internally toothed gear 2 (more precisely, the external tooth base tooth profile as discussed below), using rack approximation. In FIG. 3, the x-axis shows the translation direction of the rack, and the y-axis shows the perpendicular direction of the rack. The origin on the y-axis is the average position of the amplitude of the movement loci. The difference in the number of teeth of the rigid internally toothed gear 2 and the flexible externally toothed gear 3 is 2n (where n is a positive integer, and is normally 1). Assuming 2κmn to be the total amplitude of the movement locus in a desired transverse cross-section of the flexible externally toothed gear 3 with respect to the rigid internally toothed gear 2 (where κ is a deflection coefficient, n is a real number greater than 1, and m is the module), the movement locus of the external teeth 11 of the flexible externally toothed gear 3 is given by formula 1.

$$x = 0.5\,nm(\theta - \kappa \sin \theta)$$

$$y = \kappa mn \cos \theta \quad \text{(Formula 1)}$$

For simplicity, the movement locus is as shown in formula 1A when m=1, n=1 (difference in number of teeth: 2).

$$x = 0.5(\theta - \kappa \sin \theta)$$

$$y = \kappa \cos \theta \quad \text{(Formula 1A)}$$

(Method for Setting Tooth Profile)

The method used in the present invention for setting the tooth profile of the external teeth 11 and the internal teeth 12 will be described next. First, a transverse cross-section set in a desired position of the flexible externally toothed gear 3 along the tooth trace direction; for example, a position in the vicinity of the center along the tooth trace direction, is used as a main cross-section 20 (see FIG. 2). In order to use deep teeth in the present invention, the tooth depth in the main cross-section 20 is $2\kappa_0 m=2(1+c)m$ (deflection coefficient $\kappa_0=1+c$, where $0<c<0.5$), which is greater than the standard 2m (m: module). The rack tooth profile of an involute tooth profile having a pressure angle α of less than 20° is used as the internal tooth base tooth profile of the rigid internally toothed gear 2 and the external tooth base tooth profile of the flexible externally toothed gear 3.

Figure 4:
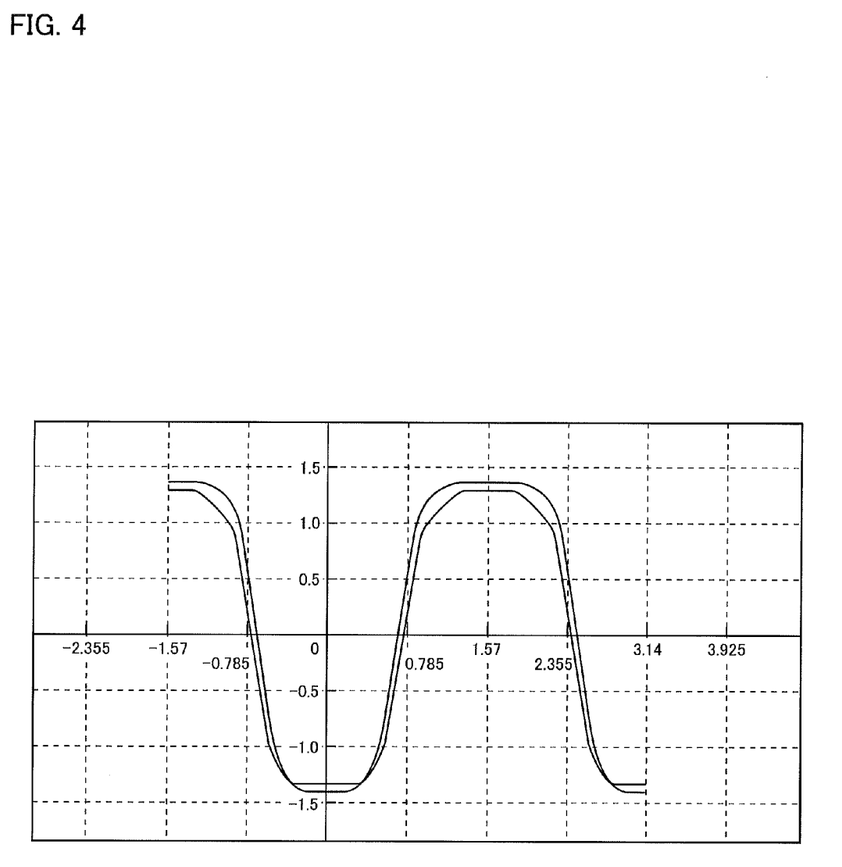
FIG. 4 is a drawing of the rack tooth profile used in the present invention.

FIG. 4 shows examples of the internal tooth base tooth profile and the external tooth base tooth profile. Here, the rack tooth profile of an involute tooth profile having a low pressure angle α of less than 15° is shown as the internal tooth base tooth profile set in the main cross-section 20 of the deflection coefficient $\kappa_0$ of the flexible externally toothed gear 3 and the external tooth base tooth profile set in a transverse cross-section of the rigid internally toothed gear 2 corresponding to the main cross-section 20.

The total amplitude of the movement locus described by a point on the ellipsoidal rim-neutral curve of the flexible externally toothed gear 3 with respect to the rigid internally toothed gear 2 in the main cross-section 20 is $\kappa_0$ nm (positive deflection where $\kappa_0>1$). The total amplitude of the movement locus described by a point on the ellipsoidal rim-neutral curve at the leading end part 19 of the external teeth 11 in the tooth trace direction is $2(\kappa_0+a)$mn, and the total amplitude of the movement locus described by a point on the ellipsoidal rim-neutral curve at the trailing end part 18 of the external teeth 11 in the tooth trace direction is $2(\kappa_0+b)$mn. Assuming that 1a, $1_0$, and 1b are the distances from the diaphragm to the leading end part 19, the main cross-section 20, and the trailing end part 18, respectively, a and b can be defined as in the following because the degree of flexing of the cylindrical barrel part 13 of the flexible externally toothed gear 3 increases in proportion to the distance from the diaphragm 15 due to coning:

$a=\kappa_0(1a-1_0)/1_0$ $b=\kappa_0(1_0-1b)/1_0$

The following description again makes reference to FIG. 3. Curve $I_0$ shows the movement locus of the external tooth base tooth profile in the main cross-section 20, and flexing at the main cross-section 20 occurs at a flexing coefficient κ of $\kappa_0$ (i.e., 1+c, where $0<c<0.5$). Curve Ia shows the movement locus of the external tooth base tooth profile in the leading end part 19, and flexing at the cross-section of the leading end part 19 occurs at a flexing coefficient κ of $\kappa_0+a$. Curve Ib shows the movement locus of the external tooth base tooth profile in the trailing end part 18, and flexing at a cross-section of the trailing end part 18 occurs at a flexing coefficient κ of $\kappa_0-b$ (>1). FIG. 3 shows a case in which the deflection coefficient κ is $\kappa_0=1.4$ (c=0.4) for curve $I_0$, the deflection coefficient κ is 1.7 (a=0.3) for curve Ia, and the deflection coefficient κ is 1.1 (b=0.3) for curve Ib. Movement locus I when κ=1 is shown by a phantom line. Thus, because each movement locus Ia, Ib, $I_0$ has positive deflection flexing, loop-shaped apexes are formed on the apex portions that are the parts of deepest meshing on these movement loci.

A tangent drawn on the loop-shaped apex of the movement locus obtained in the main cross-section 20 at which the angle formed with the major axis of the rim-neutral curve (the y-axis in FIG. 3) is the pressure angle α is called a first tangent T1. A second tangent is drawn on the loop-shaped apex on the movement locus obtained in each transverse cross-section in the tooth trace direction other than the main cross-section 20 of the external teeth at which the angle formed with the major axis of the rim-neutral curve is the pressure angle α. For example, in FIG. 3, a tangent T2a is obtained as a second tangent on the loop-shaped apex of the movement locus Ia of the leading end part 19, and a tangent T2b is obtained as a second tangent on the loop-shaped apex of the movement locus Ib of the trailing end part 18.

Next, the tooth profile in each transverse cross-section of the external teeth 11 other than the main cross-section 20 is a modified tooth profile in which the external tooth base tooth profile comprising a rack tooth profile of an involute tooth profile is modified so that causing a transition in each movement locus in each transverse cross-section of the external teeth 11 results in the tangents T2a, T2b coinciding with the first tangent T1 when viewed along the tooth trace direction of the external teeth 11.

Here, the necessary degree of modification h can be derived by the following formula (2).

$$h = \kappa \sqrt{1 - \left(\frac{2\tan\alpha/\kappa - \sqrt{1+(2\tan\alpha)^2 - 1/\kappa^2}}{1+(2\tan\alpha)^2}\right)^2} - \\ \kappa_0 \sqrt{1 - \left(\frac{2\tan\alpha/\kappa_0 - \sqrt{1+(2\tan\alpha)^2 - 1/\kappa_0^2}}{1+(2\tan\alpha)^2}\right)^2} + \\ 0.5/\tan\alpha\kappa \left(\sin^{-1}\frac{2\tan\alpha/\kappa - \sqrt{1+(2\tan\alpha)^2 - 1/\kappa^2}}{1+(2\tan\alpha)^2} - \\ \sin^{-1}\frac{2\tan\alpha/\kappa_0 - \sqrt{1+(2\tan\alpha)^2 - 1/\kappa_0^2}}{1+(2\tan\alpha)^2} - \\ \frac{2\tan\alpha - \kappa\sqrt{1+(2\tan\alpha)^2 - 1/\kappa^2}}{1+(2\tan\alpha)^2} + \\ \frac{2\tan\alpha - \kappa_0\sqrt{1+(2\tan\alpha)^2 - 1/\kappa_0^2}}{1+(2\tan\alpha)^2}\right)$$

(formula 2)

Figure 5:
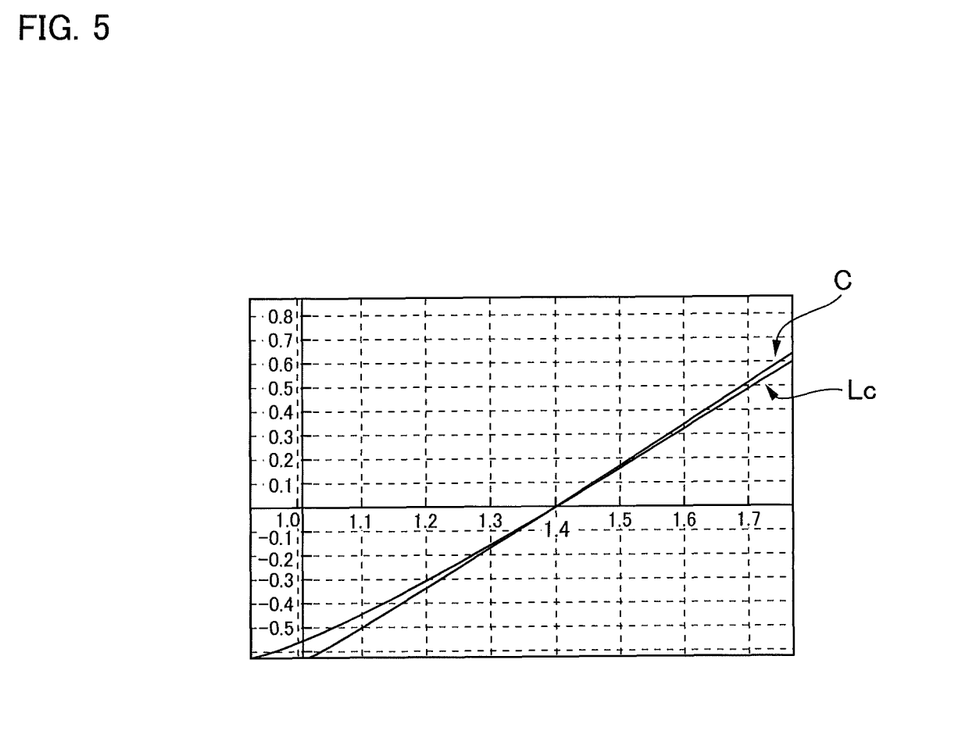
FIG. 5 is a graph showing the degree of modification at each position in the tooth trace direction of the flexible externally toothed gear.

FIG. 5 is a graph showing the degree of modification in each tooth trace position of the flexible externally toothed gear, and shows one example of formula 2 above. The horizontal axis shows a value (deflection coefficient κ) obtained by dividing the degree of radial flexing w in each transverse cross-section of the external teeth 11 of the flexible externally toothed gear 3 by mn, and the vertical axis shows a degree of modification y derived by formula 2 where $\kappa_0=1.4$. Because the modification curve C is practically a straight line, the degree of modification may be determined by using a tangent Lc drawn on the curve at x=1.4 as an approximately straight line.

Figure 6:
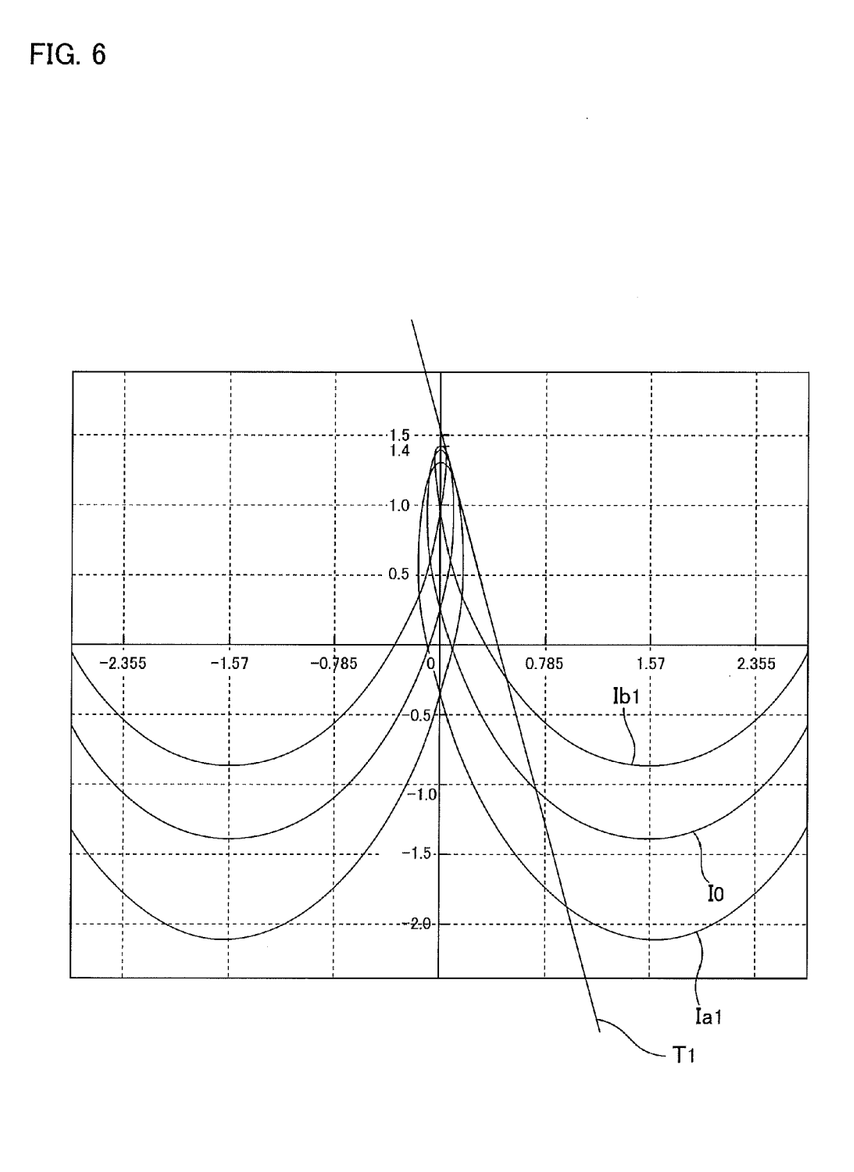
FIG. 6 shows movement loci obtained in a case where a rack is used to approximate the relative motion of both gears in the main cross-section, the leading end part, and the trailing end part in the modified external teeth.

FIG. 6 shows a movement locus Ia1 of the leading end part 19 (κ=1.7) of the external teeth 11 of the modified flexible externally toothed gear 3, a movement locus $I_0$ of the main cross-section 20 (κ=1.4), and a movement locus Ib1 of the trailing end part 18 (κ=1.1). A tangent T1 common to all three movement loci is also shown.

Figure 7:
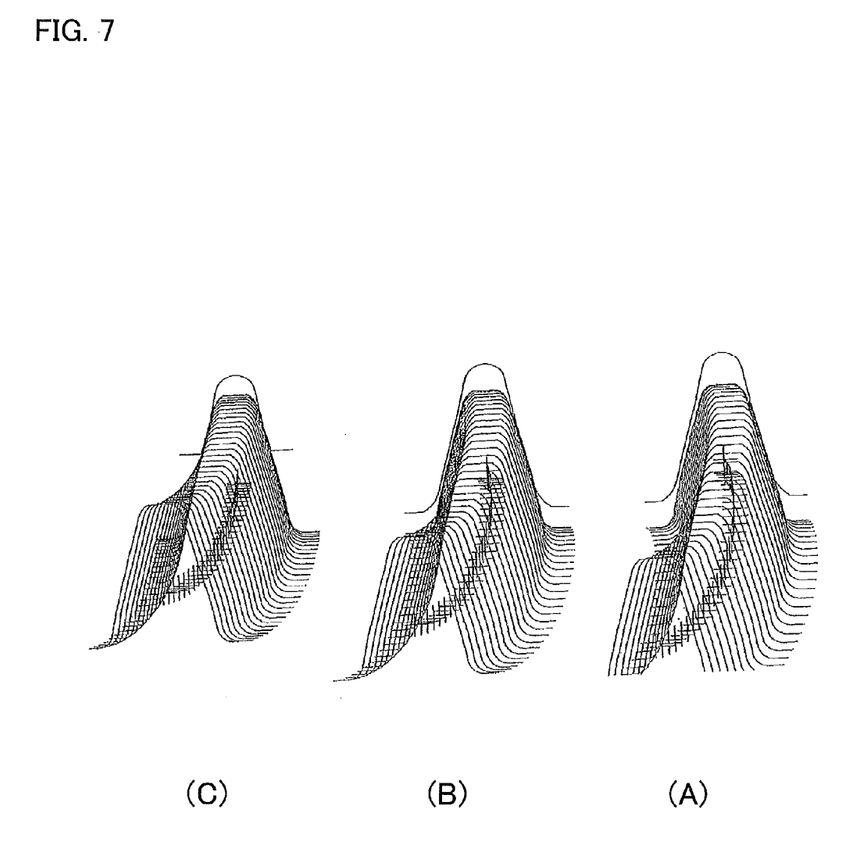

FIGS. 7 (A), (B), and (C) show the resulting meshing with the internal teeth 12 of the rigid internally toothed gear 2 at the leading end 19, the main cross-section 20, and the trailing end 18 of the external teeth 11. The drawings show states in which the gears 2, 3 have the linear parts of the tooth profiles thereof in common. Thus, in the present invention, a meshed state is formed with the internal teeth 12 in each cross-section in the tooth trace direction from the leading end 19 to the trailing end 18 via the main cross-section 20 of the external teeth 11 of the flexible externally toothed gear 3.

(Method for Setting Root Rim Thickness of External Teeth)

Figure 8:
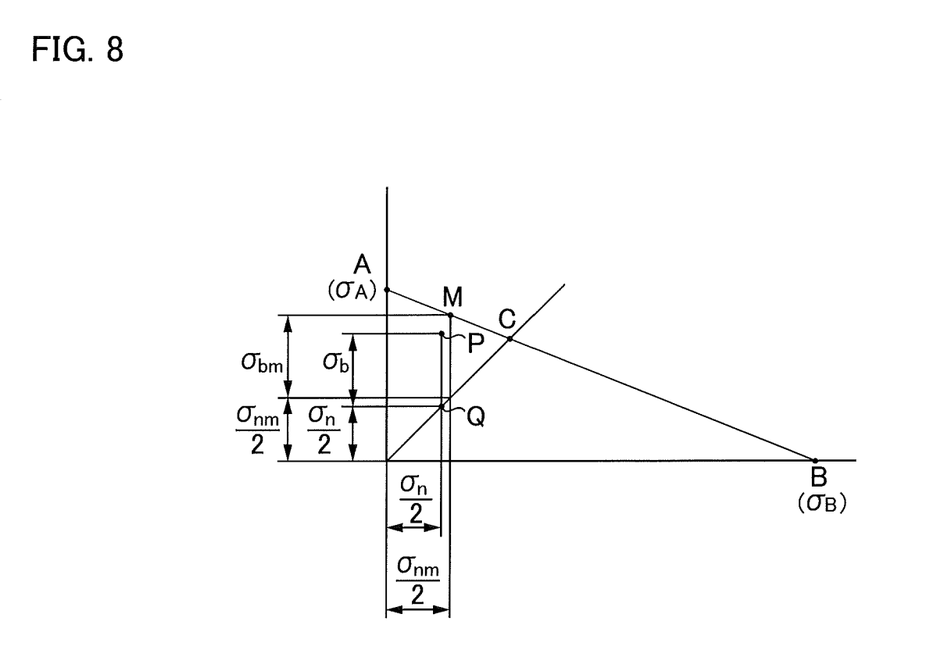
FIG. 8 is a drawing showing a technique for determining the root rim thickness of the flexible externally toothed gear using a revised Goodman diagram.

FIG. 8 shows a technique for determining the root rim thickness of the external teeth 11 of the flexible externally toothed gear 3 using a "revised Goodman diagram." Assuming $\sigma_b$ to be tensile stress related to the curving of the root rim surface on the major axis accompanying deformation of the flexible externally toothed gear 3 in the strain wave gearing 1, $\sigma_b$ is defined by the following formula from a fundamental equation of mechanics of materials.

$$\sigma_b = 3Et/(RD)$$

E Young's modulus
t Root rim thickness
R Reduction ratio
D Diameter of rim-neutral circle before deformation Assuming $\sigma_n$ to be tensile stress on the major axis as generated by output torque T, the area of the root receiving a load is DL; therefore, $\sigma_n$ is defined by the following formula.

$$\sigma_n = T/(DLt)$$

Here, L is the tooth width of the flexible externally toothed gear 3, and the value of T/L is constant in each transverse cross-section. It is given that torque is borne uniformly across the tooth width.

Therefore, the stress generated on the major axis of the flexible externally toothed gear 3 is the sum of $\sigma_b$ and $\sigma_n$, and the stress generated on the root rim surface on the minor axis of the flexible externally toothed gear 3 is compression stress $-\sigma_b$. The amplitude of stress on the flexible externally toothed gear 3 as generated by the rotation of the wave generator 4 is thereby $$((\sigma_b+\sigma_n)-(-\sigma_b))/2 = \sigma_b+\sigma_n/2,$$

and the average stress is $$((\sigma_b+\sigma_n)+(-\sigma_b))/2 = \sigma_n/2.$$

A line AB connecting a point A on the vertical axis (with $\sigma_A$ as the vertical coordinate) representing a practical alternating stress limit of a steel that is a material of the flexible externally toothed gear 3 and a point B on the horizontal axis (with $\sigma_B$ as the horizontal coordinate) representing a center between the yield stress and the tensile strength of the steel is drawn in planar coordinates to produce a "revised Goodman diagram." The triangular region enclosed by the horizontal axis, the vertical axis, and the revised Goodman line AB is an acceptable range of points in which the average stress on the root rim surface of the flexible externally toothed gear 3 is plotted on the horizontal axis and the amplitude of the average stress is plotted on the vertical axis.

Here, when the ellipsoidal rim-neutral curve of the flexible externally toothed gear 3 is given, a point P is obtained, where the vertical axis represents the amplitude of stress ($\sigma b+\sigma n/2$) appearing on the surface of the root rim in a transverse cross-section of the leading end part 19 as generated by the rotation of the wave generator 4, and the horizontal axis represents the average stress $\sigma n/2$. It is a prerequisite that point P be included in the triangular region described above.

This time, the transmission load torque T transmitted by the flexible externally toothed gear 3 is proportional to the product of the root rim thickness t and the tensile stress $\sigma_n$. The root rim thickness t is proportional to the tensile stress $\sigma_b$ accompanying flexing. Therefore, the torque T of the flexible externally toothed gear is proportional to the product of tensile stresses $\sigma_b$ and $\sigma_n$. Here, line segment PQ indicates $\sigma_b$, where Q is the point of intersection between a straight line passing through point P parallel to the vertical axis and a line passing through the origin at an angle of 45° from the horizontal axis. Accordingly, the torque T is proportional to the area of a rectangle enclosed by line segment PQ and lines extending to the vertical axis in parallel to the horizontal axis and passing through points P and Q.

Therefore, the point of maximum torque transmitted by the flexible externally toothed gear 3 having the given specification is a midpoint M of a line segment AC, where C is the point of intersection of a line passing through the origin at an angle of 45° from the horizontal axis and the revised Goodman diagram, and the root rim thickness corresponding to the midpoint M is the optimal value. Therefore, in this case, it follows from the depicted geometric relationships that $$\sigma_b = \sigma_A/2$$

$$\sigma_n = \sigma_A\sigma_B/(\sigma_A+\sigma_B)$$

and the optimal value $t_m$ of the root rim thickness $t_1$ in the main cross-section (a position on the leading end part 19) of the external teeth is given by the following formula.

$$t_1 = t_m = \sigma_A RD/(6E)$$

Furthermore, in the present invention, since there is a gradual increase in the root rim thickness in a transverse cross-section from the leading end part 19 to the trailing end part 18 of the external teeth 11, a point on the vertical axis representing the average stress $\sigma_n/2$ appears on the left side of a line passing through point M parallel to the vertical axis. The tensile stress $\sigma_b$ accompanying deformation of the flexible externally toothed gear 3 decreases as the flexing diminishes, and the point indicating the state of the stress therefore moves into the acceptable range on the left side of the line passing through point M parallel to the vertical axis on the revised Goodman diagram.

Figure 9:
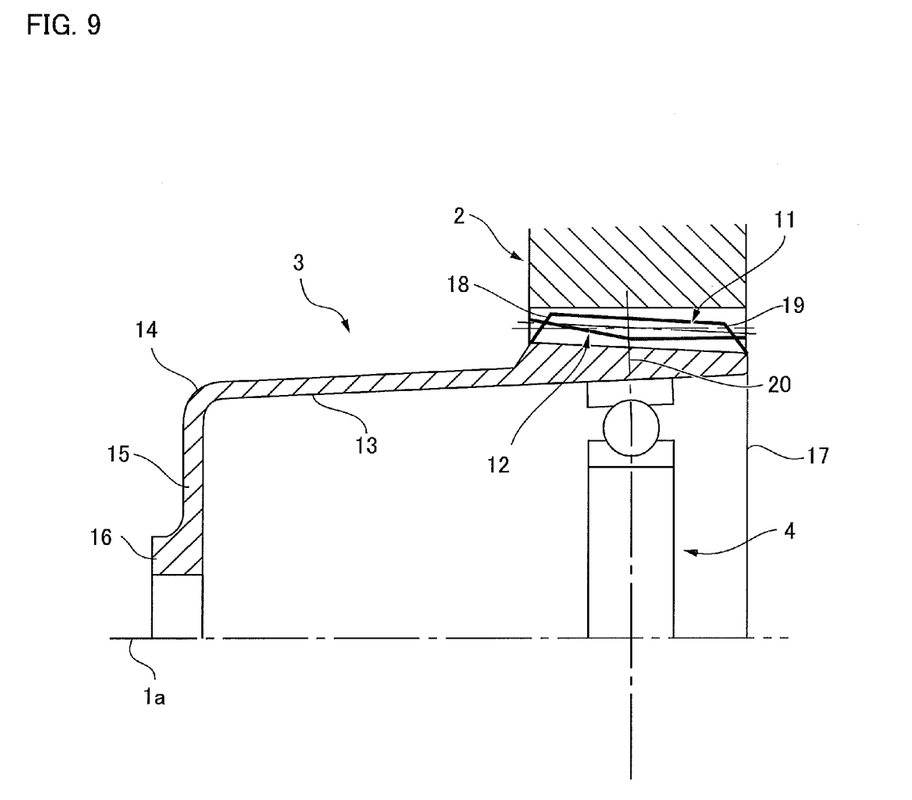
FIG. 9 is a half section showing a strain wave gearing provided with a tooth profile obtained by the present invention, the drawing showing a meshed state in a cross-section including the major axis of the flexible externally toothed gear flexed into an ellipsoidal shape.

FIG. 9 shows one example of the shape of the teeth of the flexible externally toothed gear 3 and the rigid internally toothed gear 2 having tooth profiles formed as described above, and is a vertical cross-sectional view sliced at a cross-section including a central axis 1a of both gears 2, 3 and the major axis of the ellipsoidally deformed flexible externally toothed gear 3. As shown, the tooth depth of the top of the internal teeth 12 of the rigid internally toothed gear 2 is corrected along the tooth trace direction so that there is no interference with the modified tooth profile of the external teeth. Specifically, tooth depth correction is performed at the top of the internal teeth 12 in the tooth trace direction so that the tooth depth gradually diminishes from a position corresponding to the main cross-section 20 of the external teeth 11 toward the end on the side of the trailing end part 18 of the external teeth.

Here, the external teeth 11 of the flexible externally toothed gear 3 can be conical teeth in a conical gear having teeth of equal depth. It is preferable, then, that in an axial cross-section including the major axis in a state in which the flexible externally toothed gear 3 is ellipsoidally deformed, the cylindrical top land of the external teeth 11 be a conical surface in which the external diameter gradually diminishes from the trailing end part 18 to the leading end part 19 in the tooth trace direction so that the tips of the external teeth 11 of the flexible externally toothed gear 3 are substantially parallel to the roots of the internal teeth 12 of the rigid internally toothed gear 2.

The invention claimed is:

1. A strain wave gearing comprising a rigid internally toothed gear, a flexible externally toothed gear disposed within the rigid internally toothed gear, and a wave generator fitted within the flexible externally toothed gear, the flexible externally toothed gear comprising a flexible cylindrical barrel part and a circular diaphragm extending radially from a trailing end of the cylindrical barrel part, and external teeth formed on a region of a leading end opening part of the cylindrical barrel part being flexed by the wave generator into an ellipsoidal shape from the trailing end part on the diaphragm side to the leading end part on an opening side so that a degree of flexing substantially proportional to a distance from the diaphragm is produced; wherein in the strain wave gearing:

the rigid internally toothed gear is a modified spur gear having a module m;

the flexible externally toothed gear is a modified conical gear having a module m;

a number of teeth of the flexible externally toothed gear is 2n less than a number of teeth of the rigid internally toothed gear, where n is a positive integer;

the flexible externally toothed gear is ellipsoidally deformed by the wave generator, whereby a rim-neutral circle of the external teeth of the flexible externally toothed gear is deformed into an ellipsoidal rim-neutral curve, and a degree of radial flexing with respect to the rim-neutral circle in a position on a major axis of the rim-neutral curve is κ mn, where K is a deflection coefficient greater than 1;

an internal tooth base tooth profile of the rigid internally toothed gear and an external tooth base tooth profile of the flexible externally toothed gear are involute tooth profiles having a pressure angle α of less than 20°;

there are determined movement loci of the external teeth of the flexible externally toothed gear in relation to the internal teeth of the rigid internally toothed gear, obtained when rack meshing is used to approximate meshing with the rigid internally toothed gear in a transverse cross-section at each tooth-trace direction position of the external teeth of the flexible externally toothed gear;

when, taking a transverse cross-section set in a desired position of the external teeth of the flexible externally toothed gear in the tooth trace direction to be a main cross-section, the movement locus obtained in the main cross-section is called a first movement locus, and the movement locus obtained in each transverse cross-section of the external teeth other than the main cross-section is called a second movement locus, and a tangent drawn on a loop-shaped apex of the first movement locus at which an angle formed with the major axis of the rim-neutral curve is the pressure angle α is called a first tangent, and a tangent drawn on a loop-shaped apex of the second movement locus at which an angle formed with the major axis of the rim-neutral curve is the pressure angle α is called a second tangent, a tooth profile of each transverse cross-section of the external teeth other than the main cross-section is a modified tooth profile modified to a base tooth profile comprising the involute tooth profile such that the second tangent coincides with the first tangent when viewed along a tooth trace direction of the external teeth;

a revised Goodman line AB connecting a point A on the vertical axis (O, $\sigma_A$) representing an alternating stress limit ($\sigma_A$) of a steel that is a material of the flexible externally toothed gear and a point B on the horizontal axis ($\sigma_B$, O) representing a center value ($\sigma_B$) between a yield stress and a tensile strength of the steel is drawn in planar coordinates to produce a revised Goodman diagram; and a root rim thickness of the external teeth of the flexible externally toothed gear is determined such that a coordinate point P ($\sigma_n/2$, $\sigma_b+\sigma_n/2$), in accompaniment with the ellipsoidal deformation of the flexible externally toothed gear, falls within a triangular acceptable range enclosed by the revised Goodman line AB, the horizontal axis, and the vertical axis of the revised Goodman diagram, the vertical axis being the stress amplitude ($\sigma_b+\sigma_n/2$), which is the sum of a flexural stress ($\sigma_b$) derived from flexing of the major axis appearing on a surface of the root rim and half the tensile stress ($\sigma_n$) generated by a transmission torque on the root rim, and the horizontal axis being an average stress ($\sigma_n/2$) of half the tensile stress.

2. The strain wave gearing according to claim 1, wherein a root rim thickness $t_m$ of the leading end part of the external teeth of the flexible externally toothed gear is determined by a following expression on the basis of the revised Goodman diagram;

$$t_m = \sigma_A RD/(6E),$$

where $\sigma_A$ is an alternating stress limit of the steel that is the material of the flexible externally toothed gear, R is a reduction ratio of the strain wave gearing, D is a diameter of the rim-neutral circle of the flexible externally toothed gear, and E is Young's modulus of the steel that is the material of the flexible externally toothed gear.

3. The strain wave gearing according to claim 1, wherein a tooth depth is corrected on the internal teeth of the rigid internally toothed gear so that there is no interference with the modified tooth profile from a position corresponding to the main cross-section of the external teeth to the trailing end part corresponding to the trailing end part of the external teeth along the tooth trace direction.

4. The strain wave gearing according to claim 1, wherein a tooth depth in the main cross-section of the external teeth is $2\kappa_0 mn$, where $\kappa_0$ is the deflection coefficient κ in the main cross-section, and that deflection coefficient $\kappa_0$ is such that $$\kappa_0 = 1+c,$$

where 0<c<0.5.

5. The strain wave gearing according to claim 1, wherein a degree of modification h of the modified tooth profile is derived from a following formula 1, where the deflection coefficient κ in the main cross-section of the external teeth is $\kappa_0$ that is greater than 1, the horizontal axis is the deflection coefficient κ, and the vertical axis is the degree of modification h:

$$h = \kappa\sqrt{1-\left(\frac{2\tan\alpha/\kappa - \sqrt{1+(2\tan\alpha)^2 - 1/\kappa^2}}{1+(2\tan\alpha)^2}\right)^2} - \kappa_0\sqrt{1-\left(\frac{2\tan\alpha/\kappa_0 - \sqrt{1+(2\tan\alpha)^2 - 1/\kappa_0^2}}{1+(2\tan\alpha)^2}\right)^2} + 0.5/\tan\alpha\kappa\left(\sin^{-1}\frac{2\tan\alpha/\kappa - \sqrt{1+(2\tan\alpha)^2 - 1/\kappa^2}}{1+(2\tan\alpha)^2} - \sin^{-1}\frac{2\tan\alpha/\kappa_0 - \sqrt{1+(2\tan\alpha)^2 - 1/\kappa_0^2}}{1+(2\tan\alpha)^2} - \right.$$

(Formula 1)

$$\frac{2\tan\alpha - \kappa\sqrt{1+(2\tan\alpha)^2 - 1/\kappa^2}}{1+(2\tan\alpha)^2} + \frac{2\tan\alpha - \kappa_0\sqrt{1+(2\tan\alpha)^2 - 1/\kappa_0^2}}{1+(2\tan\alpha)^2}\Bigg);$$

or
the degree of modification h is defined using a tangent as an approximating line, where the tangent is drawn to a point of the deflection coefficient $\kappa_0$ in a degree of modification curve defined by the formula 1.

6. The strain wave gearing according to claim 1, wherein the flexible externally toothed gear is a conical gear having teeth of equal depth, and
in an axial cross-section including the major axis in a state where the flexible externally toothed gear is ellipsoidally deformed, a cylindrical top land of the external teeth of the flexible externally toothed gear is a conical surface in which an external diameter gradually diminishes from the trailing end part to the leading end part in the tooth trace direction so that tips of the external teeth are substantially parallel to roots of the internal teeth of the rigid internally toothed gear.

* * * * *